US012512256B2

(12) United States Patent
Eda et al.

(10) Patent No.: US 12,512,256 B2
(45) Date of Patent: Dec. 30, 2025

(54) COIL COMPONENT

(71) Applicant: TDK CORPORATION, Tokyo (JP)

(72) Inventors: Hokuto Eda, Tokyo (JP); Hitoshi Ohkubo, Tokyo (JP); Masazumi Arata, Tokyo (JP); Masataro Saito, Tokyo (JP); Kohei Takahashi, Tokyo (JP); Takamasa Iwasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 784 days.

(21) Appl. No.: 17/867,361

(22) Filed: Jul. 18, 2022

(65) Prior Publication Data

US 2023/0023284 A1 Jan. 26, 2023

(30) Foreign Application Priority Data

Jul. 21, 2021 (JP) ................................ 2021-120281

(51) Int. Cl.

*H01F 27/28* (2006.01)
*H01F 27/02* (2006.01)
*H01F 27/29* (2006.01)
*H01F 27/32* (2006.01)

(52) U.S. Cl.

CPC .......... *H01F 27/29* (2013.01); *H01F 27/022* (2013.01); *H01F 27/323* (2013.01)

(58) Field of Classification Search

CPC ...... H01F 27/29; H01F 27/022; H01F 27/323; H01F 5/04; H01F 27/292; H01F 2017/048; H01F 17/0013; H01F 17/04

USPC .......................................................... 336/137

See application file for complete search history.

(56) References Cited

U.S. PATENT DOCUMENTS

2020/0321156 A1 10/2020 Morita
2021/0166858 A1* 6/2021 Saito ....................... H01F 27/29
2022/0189678 A1* 6/2022 Jeon ...................... H01F 27/324

FOREIGN PATENT DOCUMENTS

JP 2015-130472 A 7/2015
JP 2020-170770 A 10/2020
JP 2021-089936 A 6/2021

* cited by examiner

*Primary Examiner* — Shawki S Ismail
*Assistant Examiner* — Kazi S Hossain
(74) *Attorney, Agent, or Firm* — Oliff PLC

(57) ABSTRACT

In a coil component, fixing strength of an external terminal is improved. In the coil component, on the end face of the element body, the center position of the external terminal electrode in the first direction is biased toward the center position of the end face with respect to the center position of the outer end portion. Therefore, the fixing area between the external terminal electrode and the element body is increased on the center position side of the end face, and thus fixing strength between the external terminal electrode and the element body is improved.

4 Claims, 8 Drawing Sheets

COIL COMPONENT

CROSS-REFERENCE TO RELATED APPLICATIONS

This application is based upon and claims the benefit of priority from Japanese Patent Application No. 2021-120281, filed on 21 Jul. 2021, the entire contents of which are incorporated herein by reference.

TECHNICAL FIELD

The present disclosure relates to a coil component.

BACKGROUND

Well known in the art is a coil component in which a plurality of coils is provided in an element body. Japanese Unexamined Patent Publication No. JP2015-130472A discloses a coil component having two coils provided in an element body and four terminals.

SUMMARY

In the coil component as described above, since the plurality of external terminals are provided on the end face of the element body, a region in which the external terminal is formed is narrow compared to a configuration in which one external terminal is provided on the end face of the element body, and it is difficult to sufficiently secure fixing strength of the external terminal to the element body.

The inventors have intensively studied on fixing strength of the external terminal and newly found a technique capable of increasing the fixing strength of the external terminal.

According to the present disclosure, there is provided a coil component improved in fixing strength of an external terminal.

A coil component according to one aspect of the present disclosure includes an element body made of a metal magnetic powder-containing resin and having a first end face and a second end face parallel to each other, an insulating substrate provided in the element body, orthogonal to a first end face and a second end face, extending between the first end face and the second end face, and exposed at the first end face and the second end face, a pair of coil portions provided on the insulating substrate, each of the coil portions having a first end portion exposed to the first end face, the first end portions sandwiching a center position of the first end face in a first direction in which the insulating substrate extends on the first end face; and a pair of first external terminals provided on the first end face, connected to the first end portions of the pair of coil portions, respectively, and sandwich the center position of the first end face in the first direction, wherein a center position of the first external terminal is biased toward the center position side of the first end face with respect to a center position of the first end portion in the first direction on the first end face.

In the coil component, since the center position of the first external terminal is biased toward the center position side of the first end face with respect to the center position of the first end portion on the first end face, the fixing area between the first external terminal and the element body is increased on the center position side of the first end face, thereby improving fixing strength between the first external terminal and the element body.

In the coil component according to another aspect of the present disclosure, a separation distance between the edge of the first end portion of the coil portion and the edge of the first external terminal on a side closer to the center position of the first end face is longer than a separation distance between the edge of the first end portion of the coil portion and the edge of the first external terminal on a side farther from the center position of the first end face in the first direction on the first end face.

In the coil component according to another aspect of the present disclosure, an exposed region in which the first end face is exposed from the first external terminal is formed between an outer edge of the first end face and the first external terminal in the first direction on the first end face, and a length of the exposed region is shorter than a separation distance between the edge of the first end portion of the coil portion and the edge of the first external terminal on a side far from the center position of the first end face.

In the coil component according to another aspect of the present disclosure, the first external terminal is formed of a resin electrode containing resin and metal powder.

The coil component according to another aspect of the present disclosure further includes wherein the pair of coil portions each have a second end portion exposed to the second end face, and the second end portions sandwich a center position of the second end face in a second direction in which the insulating substrate extends on the second end face, wherein the coil component further comprises a pair of second external terminals provided on the second end surface, connected to the second end portions of the pair of coil portions, respectively, and sandwiching a center position of the second end surface in the second direction, and wherein a center position of the second external terminal is biased toward the center position side of the second end face with respect to a center position of the second end portion in the second direction on the second end face.

DETAILED DESCRIPTION

Figure 1:
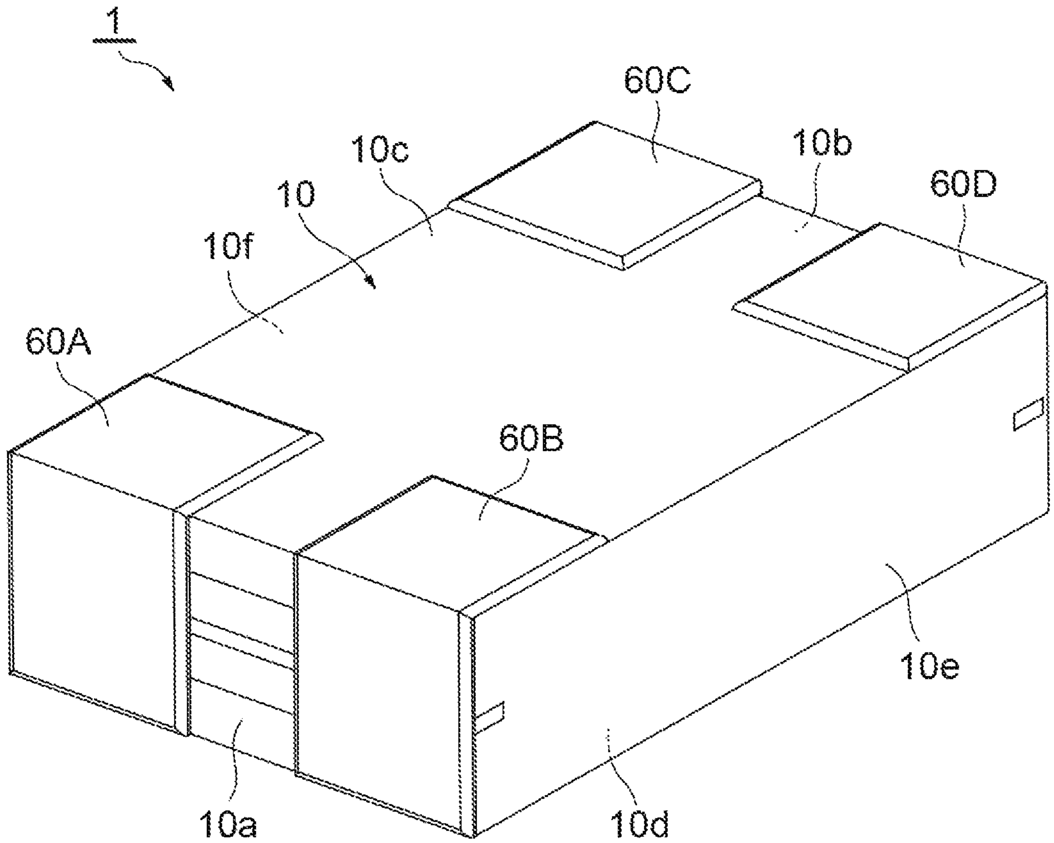
FIG. 1 is a schematic perspective view of a coil component according to an embodiment.

Hereinafter, embodiments of the present disclosure will be described in detail with reference to the accompanying drawings. In the description, the same reference numerals are used for the same elements or elements having the same functions, and redundant description will be omitted.

The coil component 1 according to the embodiment is, for example, a balun coil. The balun coil is used, for example, when a near field communication circuit (NFC circuit) is mounted on a cellular terminal, for example. The balun coil performs conversion between an unbalanced signal of the antenna and a balanced signal of the NFC circuit, thereby realizing connection between the unbalanced circuit and the balanced circuit. The coil component 1 can also be used for a common mode filter or a transformer.

As shown in FIG. 1, the coil component 1 includes an element body 10, a coil structure 20 embedded in the element body 10, and two pairs of external terminal electrodes 60A, 60B, 60C, and 60D provided on the element body 10.

The element body 10 has a rectangular parallelepiped outer shape and has six surfaces 10*a* to 10*f*. As an example, the element body 10 is designed to have dimensions of long side 2.0 mm, short side 1.25 mm, and height 0.65 mm. Among the surfaces 10*a* to 10*f* of the element body 10, the end face 10*a* (first end face) and the end face 10*b* (second end face) are parallel to each other, the upper face 10*c* and the lower face 10*d* are parallel to each other, and the side face 10*e* and the side face 10*f* are parallel to each other. The upper face 10*c* of the element body 10 is a face facing in parallel to a mounting surface of a mounting substrate on which the coil component 1 is mounted.

The element body 10 is made of a metal magnetic powder-containing resin 12 which is one type of magnetic material. The magnetic metal powder-containing resin 12 is a bound powder in which magnetic metal powder is bound by a binder resin. The metal magnetic powder of the metal magnetic powder-containing resin 12 is composed of, for example, an iron-nickel alloy (permalloy alloy), carbonyl iron, an amorphous, FeSiCr alloy in amorphous or crystalline, sendust, or the like. The binder resin is, for example, a thermosetting epoxy resin. In the present embodiment, the content of the metallic magnetic powder in the bound powder is 80 to 92 vol % in terms of volume percent, and 95 to 99 wt % in terms of weight percent. From the viewpoint of magnetic properties, the content of the metallic magnetic powder in the bound powder may be 85 to 92 vol % in terms of volume percent and 97 to 99 wt % in terms of weight percent. The magnetic powder of the metal magnetic powder-containing resin 12 may be a powder having one type of average particle diameter or may be a mixed powder having a plurality of types of average particle diameters.

The metal magnetic powder-containing resin 12 of the element body 10 integrally covers a coil structure 20 described later. Specifically, the metal magnetic powder-containing resin 12 covers the coil structure from above and below and covers the outer periphery of the coil structure 20. The metal magnetic powder-containing resin 12 fills the inner peripheral region of the coil structure 20.

The coil structure 20 includes an insulating substrate 30, an upper coil structure 40A provided on an upper side of the insulating substrate 30, and a lower coil structure 40B provided on a lower side of the insulating substrate 30.

Figure 3:
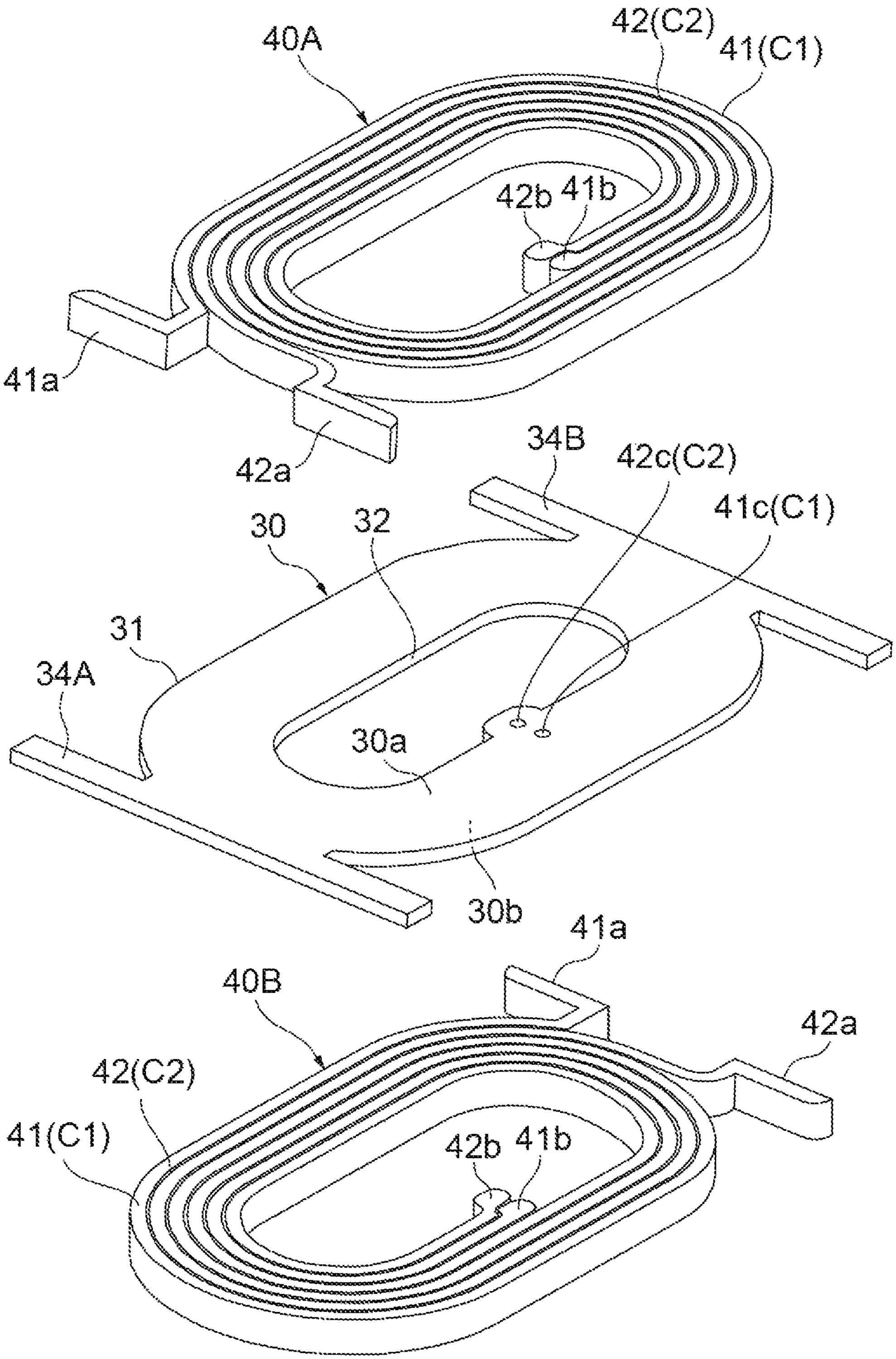
FIG. 3 is an exploded view of the coil shown in FIG. 2.

The insulating substrate 30 has a flat plate shape, extends between the end faces 10*a* and 10*b* of the element body 10, and is designed to be orthogonal to the end faces 10*a* and 10*b*. The insulating substrate 30 extends in parallel to the upper face 10*c* and the lower face 10*d* of the element body 10. As shown in FIG. 3, the insulating substrate includes an elliptical ring-shaped coil forming portion 31 extending along the long-side direction of the element body 10, and a pair of frame portions 34A and 34B extending along the short-side direction of the element body 10 and sandwiching the coil forming portion 31 from both sides. An elliptical opening 32 extending along the long-side direction of the element body 10 is provided in a central portion of the coil forming portion 31.

The insulating substrate 30 is made of a nonmagnetic insulating material. The thickness of the insulating substrate 30 can be designed in a range of 10 to 60 μm, for example. In the present embodiment, the insulating substrate 30 has a configuration in which glass cloth is impregnated with epoxy resin. The resin constituting the insulating substrate 30 is not limited to the epoxy-based resin and may be a BT resin, polyimide, aramid, or the like. The insulating substrate 30 may be made of ceramic or glass. The constituent material of the insulating substrate 30 may be a mass-produced printed circuit board material. The insulating substrate 30 may be made of a plastic material used for a Bluetooth printed circuit board, a FR4 printed circuit board, or a FR5 printed circuit board.

Figure 2:
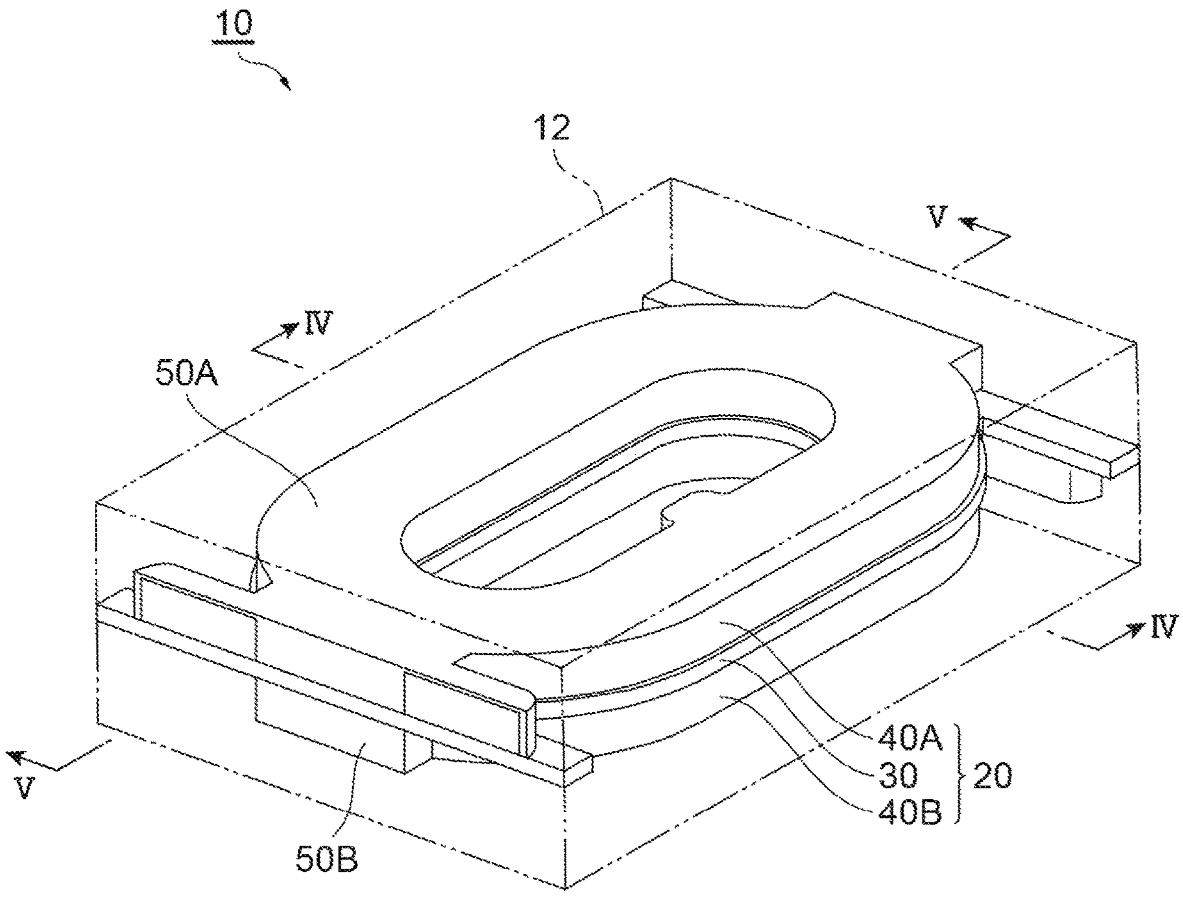
FIG. 2 shows the inside of the coil component of FIG. 1.

The upper coil structure 40A is provided on the upper face 30*a* of the coil forming portion 31 of the insulating substrate 30. As shown in FIGS. 2 and 3, the upper coil structure 40A includes a first planar coil 41, a second planar coil 42, and an upper insulator 50A. The first planar coil 41 and the second planar coil 42 are wound adjacent to each other in parallel on the upper face 30*a* of the insulating substrate 30. The first planar coil 41 is a substantially elliptical spiral air-core coil wound around the opening 32 of the coil forming portion 31 in the same layer on the upper face 30*a* of the insulating substrate 30. The number of turns of the first planar coil 41 may be one or a plurality of turns. In the present embodiment, the number of turns of the first planar coil 41 is three to four. The first planar coil 41 has an outer end portion 41*a* and an inner end portion 41*b*. The outer end portion 41*a* is provided on the frame portion 34A and is exposed from the end face 10*a* of the element body 10. The inner end portion 41*b* is provided at an edge of the opening 32. The insulating substrate 30 is provided with a first through conductor 41*c* extending in the thickness-wise direction of the insulating substrate 30 at a position overlapping the inner end portion 41*b* of the first planar coil 41. The first planar coil 41 is made of Cu, for example, and can be formed by electrolytic plating.

Similarly to the first planar coil 41, the second planar coil 42 is a substantially elliptical spiral air-core coil wound around the opening 32 of the coil forming portion 31 in the same layer on the upper face 30*a* of the insulating substrate 30. The second planar coil 42 is wound so as to be adjacent to and alongside with the first planar coil 41 on the inner peripheral side of the first planar coil 41. The number of turns of the second planar coil 42 may be one or a plurality of turns. In the present embodiment, the number of turns of the second planar coil 42 is the same as the number of turns of the first planar coil 41. The second planar coil 42 has an outer end portion 42*a* and an inner end portion 42*b*. Similarly to the outer end 41*a* of the first planar coil 41, the outer end portion 42*a* of the second planar coil 42 is provided in the frame portion 34A and is exposed from the end face 10*a* of the element body 10. The inner end portion 42*b* of the second planar coil 42 is provided at the edge of the opening 32 and is adjacent to the inner end portion 41*b* of the first planar coil 41. The insulating substrate 30 is provided with a second through conductor 42*c* extending in the thickness direction of the insulating substrate 30 at a position overlapping with the inner end portion 42*b* of the second planar coil 42. Similarly to the first planar coil 41, the second planar coil 42 is made of Cu, for example, and can be formed by electrolytic plating.

Figure 4:
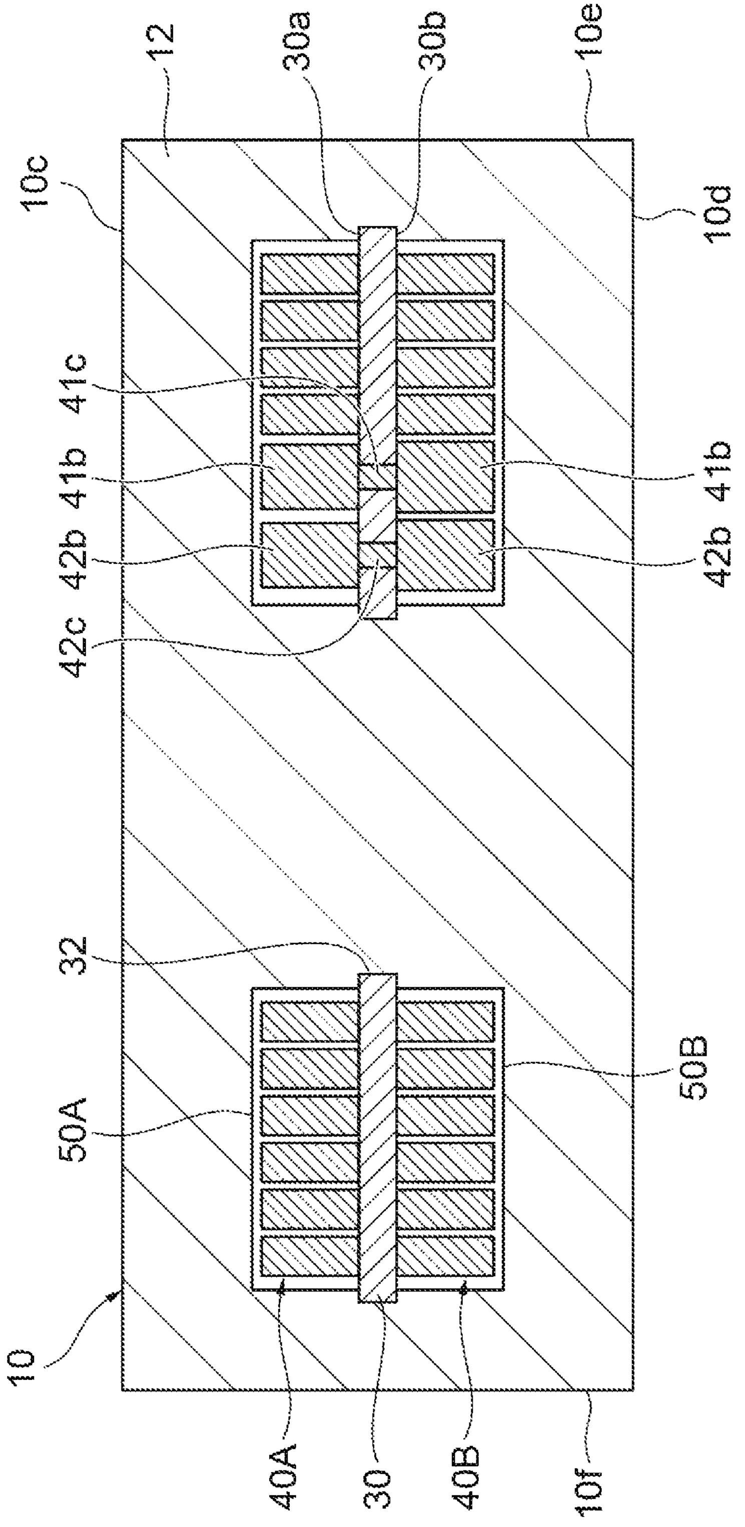
FIG. 4 is a cross-sectional view taken along line IV-IV of the coil component shown in FIG. 2.
Figure 5:
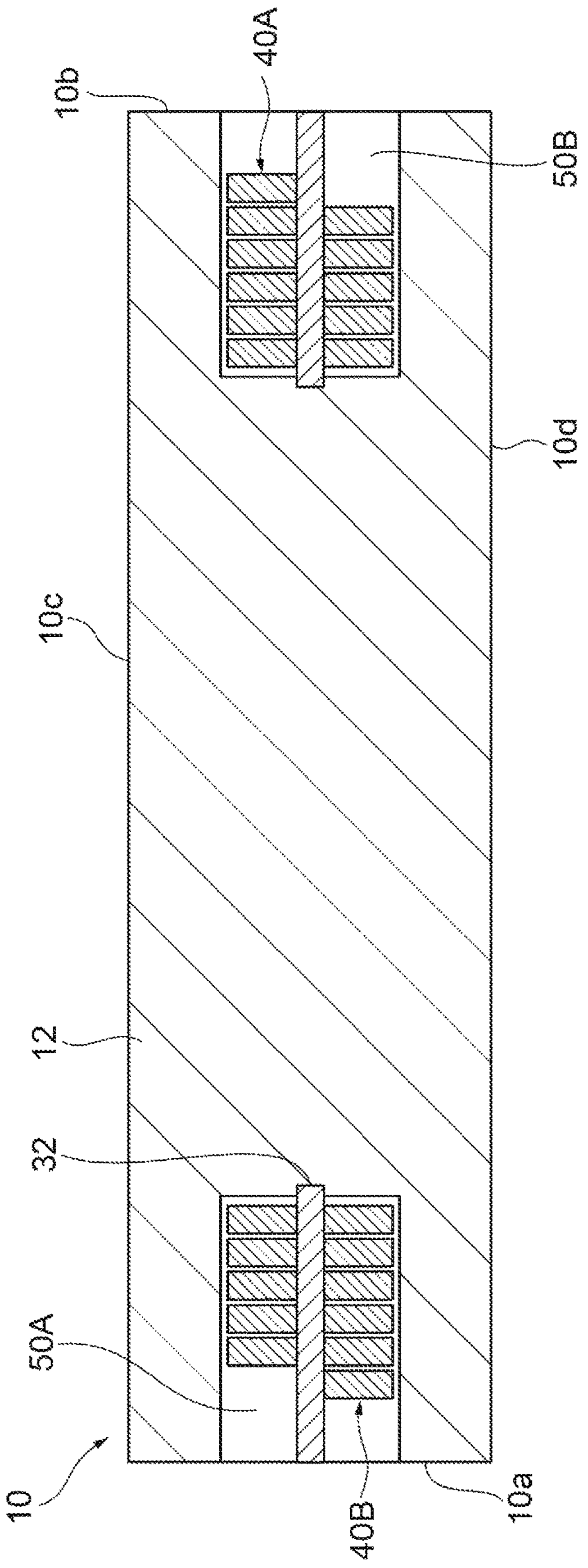
FIG. 5 is a cross-sectional view taken along line V-V of the coil component shown in FIG. 2.
Figure 6:
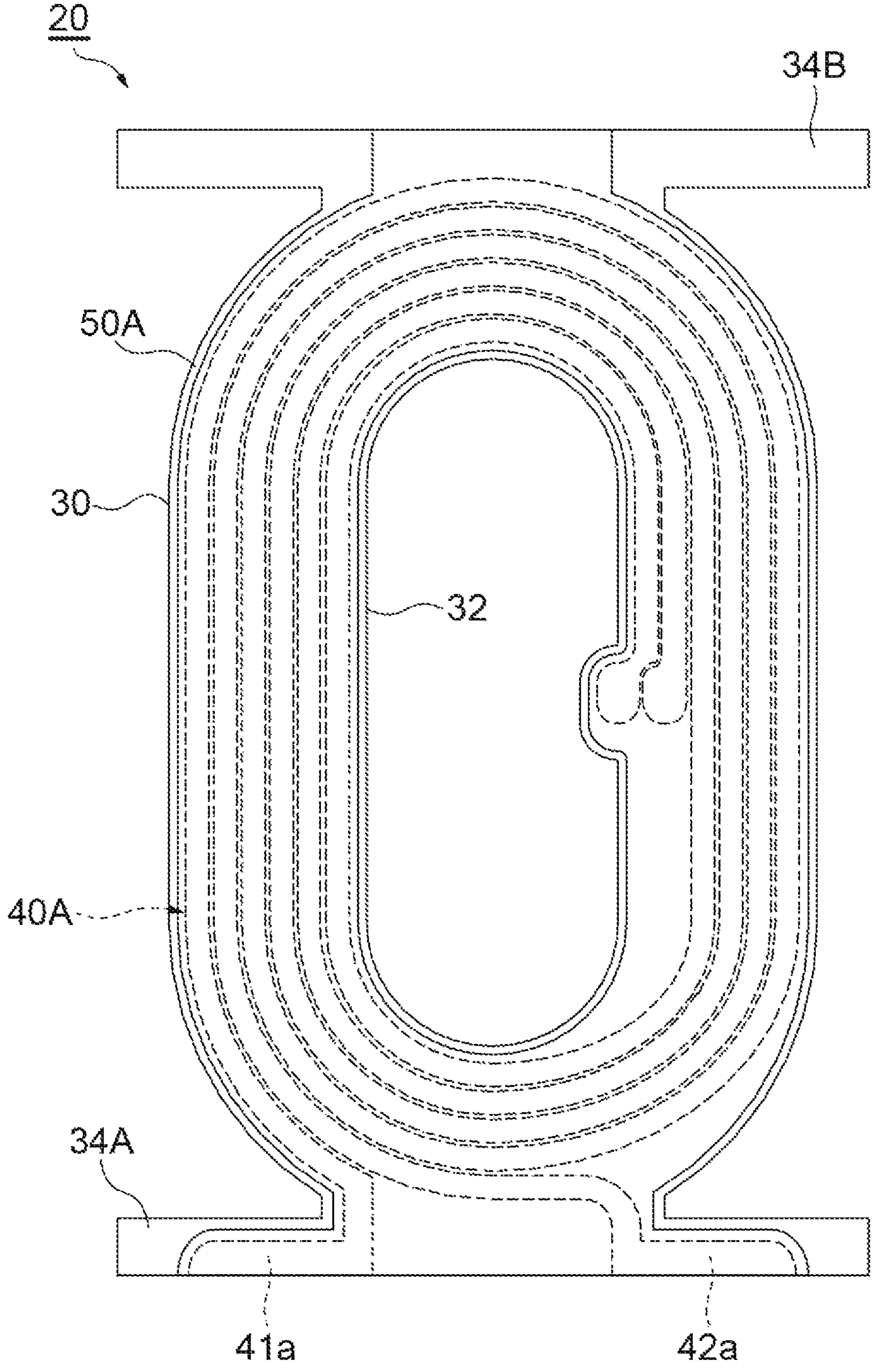
FIG. 6 is a plan view of the coil shown in FIG. 2.

The upper insulator 50A is provided on the upper face 30*a* of the insulating substrate 30 and is a thick-film resist patterned by known photolithography. The upper insulator 50A defines a plating growth region of the first planar coil 41 and the second planar coil 42. In the present embodiment, as shown in FIG. 4, the upper insulator 50A integrally covers the first planar coil 41 and the second planar coil 42, and more specifically, covers side faces and upper faces of the first planar coil 41 and the second planar coil 42. As shown in FIGS. 5 and 6, a portion of the upper insulator 50A extends from the inside of the element body 10 to the end face 10*a* of the element body 10 through between the outer end portion 41*a* and the outer end portion 42*a*, and is exposed at the end face 10*a*. Further, as shown in FIGS. 5 and 6, a part of the upper insulator 50A extends from the inside of the element body to the end face 10*b* along the substrate upper face 30*a* and is exposed at the end face 10*b*. The upper insulator 50A is thicker than the first planar coil 41 and the second planar coil 42. The upper insulator 50A is made of, for example, epoxy.

The lower coil structure 40B is provided on the lower face 30*b* of the coil forming portion 31 of the insulating substrate 30. As shown in FIGS. 2 and 3, the lower coil structure 40B includes a first planar coil 41, a second planar coil 42, and a lower insulator 50B. The first planar coil 41 and the second planar coil 42 are wound in parallel and adjacent to each other on the lower face 30*b* of the insulating substrate 30.

The first planar coil 41 and the second planar coil 42 of the lower coil structure 40B are symmetrical to the first planar coil 41 and the second planar coil 42 of the upper coil structure 40A. More specifically, the first planar coil 41 and the second planar coil 42 of the lower coil structure body 40B have shapes obtained by inverting the first planar coil 41 and the second planar coil 42 of the upper coil structure body 40A around axes parallel to the short sides of the element body 10.

The outer end portion 41*a* of the first planar coil 41 of the lower coil structure 40B is provided in the frame portion 34B and is exposed from the end face 10*b* of the element body 10. The inner end portion 41*b* of the first planar coil 41 of the lower coil structure 40B overlaps the first through conductor 41*c* provided in the insulating substrate 30. Therefore, the inner end portion 41*b* of the first planar coil 41 of the lower coil structure 40B is electrically connected to the inner end portion 41*b* of the first planar coil 41 of the upper coil structure 40A via the first through conductor 41*c*. The first planar coil 41 of the lower coil structure 40B is made of Cu, for example, and can be formed by electrolytic plating.

The outer end portion 42*a* of the second planar coil 42 of the lower coil structure 40B is provided in the frame portion 34B and is exposed from the end face 10*b* of the element body 10. The inner end portion 42*b* of the second planar coil 42 of the lower coil structure 40B overlaps the second through conductor 42*c* provided in the insulating substrate 30. Therefore, the inner end portion 42*b* of the second planar coil 42 of the lower coil structure 40B is electrically connected to the inner end portion 42*b* of the second planar coil 42 of the upper coil structure 40A via the second through conductor 42*c*. The second planar coil 42 of the lower coil structure 40B is made of, for example, Cu, and can be formed by electrolytic plating.

The lower insulator 50B is provided on the lower face 30*b* of the insulating substrate 30 and is a thick-film resist patterned by known photolithography. Similarly to the upper insulator 50A, the lower insulator 50B defines a plating growth region for the first planar coil 41 and the second planar coil 42. In the present embodiment, as shown in FIG. 4, the lower insulator 50B integrally covers the first planar coil 41 and the second planar coil 42, and more specifically, covers side faces and upper faces of the first planar coil 41 and the second planar coil 42. Similarly to the upper insulator 50A, a portion of the lower insulator 50B extends from the inside of the element body 10 to the end face 10*b* of the element body 10 through between the outer end portion 41*a* and the outer end portion 42*a*, and is exposed at the end face 10*b*. A portion of the lower insulator 50B extends along the lower face 30*b* from the inside of the element body 10 to the end face 10*a* and is exposed at the end face 10*a*. The lower insulator 50B is thicker than the first planar coil 41 and the second planar coil 42. The lower insulator 50B may have the same thickness as the upper insulator 50A. The lower insulator 50B is made of, for example, epoxy.

The element body 10 includes a pair of coil portions C1 and C2 constituting a double coil structure. The first coil portion C1 includes the first planar coil 41 of the upper coil structure 40A provided on the upper face 30*a* of the insulating substrate 30, the first planar coil 41 of the lower coil structure 40B provided on the lower face 30*b* of the insulating substrate 30, and the first through conductor 41*c* connecting the first planar coils 41 on both faces. In the first coil portion C1, an outer end portion 41*a* of the first planar coil 41 of the upper coil structure 40A constitutes a first end portion, and an outer end portion 41*a* of the first planar coil 41 of the lower coil structure 40B constitutes a second end portion. The second coil portion C2 is constituted by the second planar coil 42 of the upper coil structure 40A provided on the upper face 30*a* of the insulating substrate 30, the second planar coil 42 of the lower coil structure 40B provided on the lower face 30*b* of the insulating substrate 30, and the second through conductor 42*c* connecting the second planar coils 42 on both faces. In the second coil portion C2, an outer end portion 42*a* of the second planar coil 42 of the upper coil structure 40A constitutes a first end portion, and an outer end portion 42*a* of the second planar coil 42 of the lower coil structure 40B constitutes a second end portion.

The two pairs of external terminal electrodes 60A, 60B, 60C, and 60D are provided in pairs on end faces 10*a* and 10*b* of the element body 10 that are parallel to each other.

Figure 7:
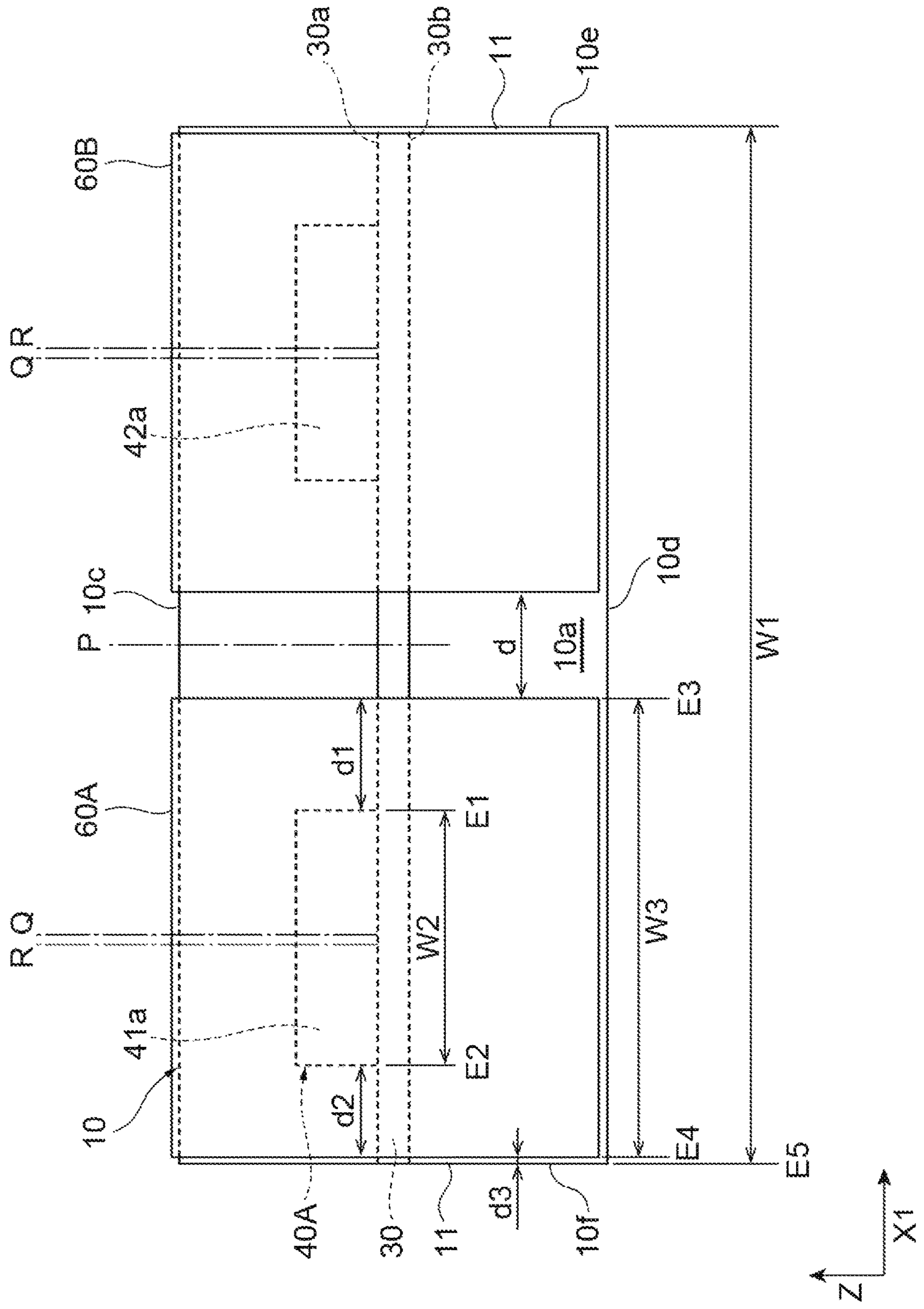
FIG. 7 is a view showing one end face of an element body of the coil component shown in FIG. 1.

Of the pair of external terminal electrodes 60A and 60B (first external terminals) provided on the end face 10*a*, the external terminal electrode 60A is connected to the outer end portion 41*a* of the first planar coil 41 of the upper coil structure 40A, and the external terminal electrode 60B is connected to the outer end portion 42*a* of the second planar coil 42 of the upper coil structure 40A. As shown in FIG. 7, when viewed from the end face 10*a* side, the external terminal electrode 60A is biased toward the side face 10*f* side and covers the end face 10*a* up to near the edge of the side face 10*f*. The external terminal electrode 60B is biased to the side face 10*e* side, and covers the end face 10*a* up to near the edge of the side face 10*e*. When viewed from the end face 10*a* side, the external terminal electrode 60A and the external terminal electrode 60B are separated by a predetermined uniform width d.

Of the pair of external terminal electrodes 60C and 60D (second external terminals) provided on the end face 10*b*, the external terminal electrode 60C is connected to the outer end portion 41*a* of the first planar coil 41 of the lower coil structure 40B, and the external terminal electrode 60D is connected to the outer end portion 42*a* of the second planar coil 42 of the lower coil structure 40B. The external terminal electrode 60C is biased to the side face 10*f* side and covers the end face 10*b* up to near the edge of the side face 10*f*. The external terminal electrode 60D is biased to the side face 10*e* side, and covers the end face 10*b* up to near the edge of side face 10*e*. When viewed from the end face 10*b* side, the external terminal electrode 60C and the external terminal electrode 60D are separated by a predetermined uniform width d.

The external terminal electrode 60A of the end face 10*a* and the external terminal electrode 60C of the end face 10*b* are provided at positions corresponding to each other in the long-side direction of the element body 10. Similarly, the external terminal electrode 60B on the end face 10*a* and the external terminal electrode 60D on the end face 10*b* are provided at positions corresponding to each other in the long-side direction of the element body 10.

Each of the external terminal electrodes 60A, 60B, 60C, and 60D is bent in an L shape and continuously covers the end faces 10*a* and 10*b* and the upper face 10*c*. In the present embodiment, the external terminal electrodes 60A, 60B, 60C, and 60D are made of resinous electrodes, for example, made of resins containing Ag powder.

Next, the configuration of the end faces 10*a* and 10*b* of the element body 10 will be described with reference to FIGS. 7 and 8.

As shown in FIG. 7, the end face 10*a* of the element body 10 has a rectangular shape extending in the direction in which the insulating substrate 30 extends (first direction, X1 direction in FIG. 7). The width of the end face 10*a* of the element body 10 in a direction orthogonal to the first direction X1 (i.e. in the Z direction shown in FIG. 7) is W1, and in the present embodiment, the width W1 is 1.25 mm.

In the end face 10*a* of the element body 10, the outer end portion 41*a* of the first planar coil 41 and the outer end portion 42*a* of the second planar coil 42 are arranged along the first direction X1 on the upper face 30*a* of the insulating substrate 30, and sandwich the center position P of the end face 10*a* in the first direction X1. In the present embodiment, both the outer end portion 41*a* of the first planar coil 41 and the outer end portion 42*a* of the second planar coil 42 have rectangular exposed shapes extending in the first direction X1. Widths W2 of the outer end portions 41*a* and 42*a* in the Z direction (i.e., lengths in the X1 direction) in the end face 10*a* are uniform and are, for example, 0.25 mm. In the end face 10*a* of the element body 10, the outer end portion 41*a* of the first planar coil 41 and the outer end portion 42*a* of the second planar coil 42 can have a line-symmetric relationship with respect to the center position P of the end face 10*a*.

The pair of external terminal electrodes 60A and 60B sandwich the center position P of the end face 10*a* in the first direction X1 in the end face 10*a* of the element body 10. In the present embodiment, each of the external terminal electrodes 60A and 60B has a quadrangular shape when viewed from the end face 10*a* side. Widths W3 of the external terminal electrodes 60A and 60B in the Z direction are uniform when viewed from the end face 10*a* side, and are, for example, 0.5 mm. When viewed from the end face 10*a* of the element body 10, the pair of external terminal electrodes 60A and 60B can have a line-symmetric relationship with respect to the center position P of the end face 10*a*.

In the end face 10*a* of the element body 10, the center positions Q of the external terminal electrodes 60A and 60B in the first direction X1 are biased to the center position P side of the end face 10*a* with respect to the center position R of the outer end portions 41*a* and 42*a*. In the present embodiment, the center positions Q of the external terminal electrodes 60A and 60B are biased toward the center position P of the end face 10*a* by 0.03 mm with respect to the center position R of the outer end portions 41*a* and 41*b*. In the coil component 1, since the external terminal electrodes 60A and 60B are biased as described above, it is possible to form the external terminal electrodes 60A and 60B closer to the center position P of the end face 10*a* compared to a configuration in which the center position Q of the external terminal electrodes 60A and 60B coincides with the center position R of the outer end portions 41*a* and 42*a*. That is, the fixing areas between the external terminal electrodes 60A and 60B and the element body 10 are enlarged on the center position P side of the end face 10*a*. As a result, in the coil component 1, the fixing strength between the external terminal electrodes 60A and 60B and the element body 10 is improved.

In the present embodiment, with respect to the first direction X1 of the end face 10*a*, a separation distance d1 between the edge E1 of the outer end portions 41*a* and 42*a* and the edge E3 of the external terminal electrodes 60A and 60B on the side closer to the center position P of the end face 10*a* is designed to be longer than a separation distance d2 between the edge E2 of the outer end portions 41*a* and 42*a* and the edge E4 of the external terminal electrodes 60A and 60B on the side farther from the center position P of the end face 10*a* (i.e., d1>d2).

In addition, in the present embodiment, with respect to the first direction X1 in the end face 10*a*, the exposed region 11 in which the end face 10*a* is exposed from the external terminal electrodes 60A and 60B is formed between the outer edge E5 of the end face 10*a* and the external terminal electrodes 60A and 60B. The distance d3 of the exposed region 11 in the first direction X1 is designed so as to be shorter than the separation distance d2 between the edge E2 of the outer end portions 41*a* and 42*a* and the edge E4 of the external terminal electrodes 60A and 60B on the side farther from the center position P of the end face 10*a* (d3<d2). As shown in FIG. 7, the external terminal electrodes 60A and 60B do not reach to the side faces 10*e* and 10*f* from the end face 10*a*. With respect to the first direction X1 in the end face 10*a*, the outer edge E5 of the end face 10*a* and the edge E4 of the external terminal electrodes 60A and 60B may coincide with each other, the exposed region 11 may not be formed (i.e., d3=0), and the external terminal electrodes 60A and 60B may not wrap around from the end face 10*a* to the side faces 10*e* and 10*f*.

Figure 8:
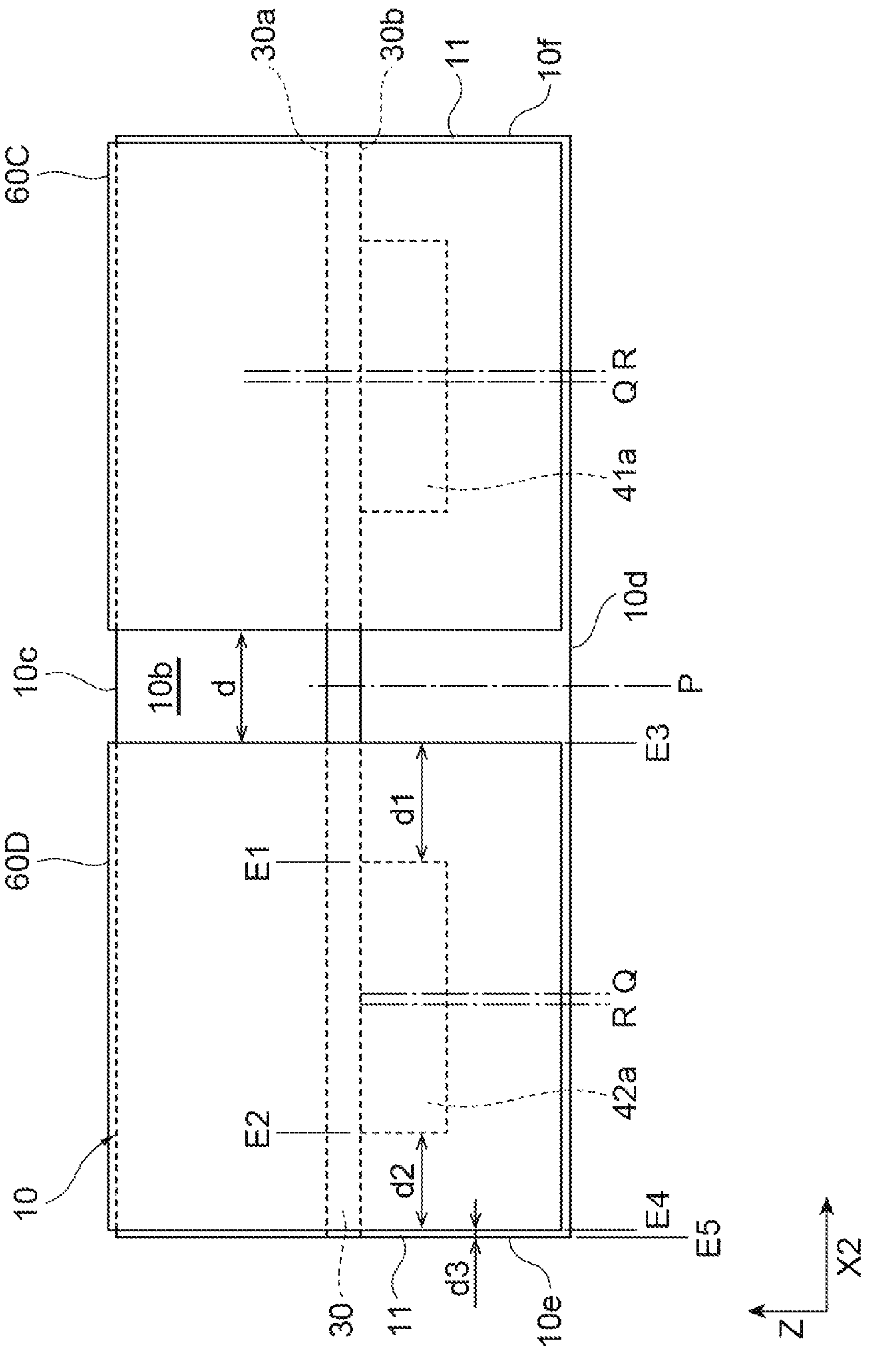
FIG. 8 is a view showing the other end face of the element body of the coil component shown in FIG. 1.

As shown in FIG. 8, the end face 10*b* of the element body 10 has a rectangular shape extending in the direction in which the insulating substrate 30 extends (second direction, X2 direction in FIG. 8). The shape and dimensions of the end face 10*b* are identical or similar to those of the end face 10*a* shown in FIG. 7.

In the end face 10*b* of the element body 10, the outer end portion 41*a* of the first planar coil 41 and the outer end portion 42*a* of the second planar coil 42 are arranged along the second direction X2 on the lower face 30*b* of the insulating substrate 30 and sandwich the center position P of the end face 10*b* in the second direction X2. In the present embodiment, both the outer end portion 41*a* of the first planar coil 41 and the outer end portion 42*a* of the second planar coil 42 have rectangular exposed shapes extending in the second direction X2. The shapes and dimensions of the outer end portions 41*a* and 42*a* on the end face 10*b* are identical or similar to those of the outer end portions 41*a* and 42*a* on the end face 10*a* shown in FIG. 7.

The pair of external terminal electrodes 60C and 60D sandwich the center position P of the end face 10*b* in the second direction X2 in the end face 10*b* of the element body 10. In the present embodiment, each of the external terminal electrodes 60C and 60D has a quadrangular shape when viewed from the end face 10*b* side. The shapes and dimensions of the external terminal electrodes 60C and 60D viewed from the end face 10*b* side are identical or similar to those of the external terminal electrodes 60A and 60B viewed from the end face 10*a* side shown in FIG. 7.

In the end face 10*b* of the element body 10, the center position Q of the external terminal electrodes 60C and 60D with respect to the second direction X2 is biased to the center position P side of the end face 10*b* with respect to the center positions R of the outer end portions 41*a* and 42*a*. In the present embodiment, the center positions Q of the external terminal electrodes 60C and 60D are biased to the center position P of the end face 10*b* by 0.03 mm with respect to the center position R of the outer end portions 41*a* and 42*a*. In the coil component 1, since the external terminal electrodes 60C and 60D are biased as described above, it is possible to form the external terminal electrodes 60C and 60D closer to the center position P of the end face 10*b* compared to a configuration in which the center position Q of the external terminal electrodes 60C and 60D coincides with the center position R of the outer end portions 41*a* and 42*a*. That is, the fixing areas between the external terminal electrodes 60C and 60D and the element body 10 are enlarged on the center position P side of the end face 10*b*. As a result, in the coil component 1, the fixing strength between the external terminal electrodes 60C and 60D and the element body 10 is improved.

In the present embodiment, with respect to the second direction X2 of the end face 10*b*, a separation distance d1 between the edge E1 of the outer end portions 41*a* and 42*a* and the edge E3 of the external terminal electrodes 60C and 60D on the side closer to the center position P of the end face 10*b* is designed to be longer than a separation distance d2 between the edge E2 of the outer end portions 41*a* and 42*a* and the edge E4 of the external terminal electrodes 60C and 60D on the side farther from the center position P of the end face 10*b* (i.e., d1>d2).

In addition, in the present embodiment, with respect to the second direction X2 in the end face 10*b* the exposed region 11 in which the end face 10*b* is exposed from the external terminal electrodes 60C and 60D is formed between the outer edge E5 of the end face 10*b* and the external terminal electrodes 60C and 60D. The distance d3 of the exposed region 11 in the second direction X2 is designed to be shorter than the separation distance d2 between the edge E2 of the outer end portions 41*a* and 42*a* and the edge E4 of the external terminal electrodes 60C and 60D on the side farther from the center position P of the end face 10*b* (d3<d4). As shown in FIG. 8, the external terminal electrodes 60C and 60D do not reach to the side faces 10*e* and 10*f* from the end face 10*b*. With respect to the second direction X2 in the end face 10*b*, the outer edge E5 of the end face 10*b* and the edge E4 of the external terminal electrodes 60C and 60D may coincide with each other, the exposed region 11 may not be formed (i.e., d3=0), and the external terminal electrodes 60C and 60D may not wrap around from the end face 10*b* to the side faces 10*e* and 10*f*.

It should be noted that the present disclosure is not limited to the above-described embodiment and may take various forms.

For example, the number of turns of the first coil portion and the number of turns of the second coil portion can be increased or decreased as appropriate. Further, the element body of the coil portion may include three or more coil portions.

What is claimed is:

1. A coil component comprising:

an element body made of a metal magnetic powder-containing resin and having a first end face and a second end face parallel to each other;

an insulating substrate provided in the element body, orthogonal to a first end face and a second end face, extending between the first end face and the second end face, and exposed at the first end face and the second end face;

a pair of coil portions provided on the insulating substrate, each of the coil portions having a first end portion exposed to the first end face, the first end portions sandwiching a center position of the first end face in a first direction in which the insulating substrate extends on the first end face; and a pair of first external terminals provided on the first end face, connected to the first end portions of the pair of coil portions, respectively, and sandwich the center position of the first end face in the first direction;

wherein a center position of the first external terminal is biased toward the center position side of the first end face with respect to a center position of the first end portion in the first direction on the first end face, and a separation distance between the edge of the first end portion of the coil portion and the edge of the first external terminal on a side closer to the center position of the first end face is longer than a separation distance between the edge of the first end portion of the coil portion and the edge of the first external terminal on a side farther from the center position of the first end face in the first direction on the first end face.

2. The coil component according to claim 1, wherein an exposed region in which the first end face is exposed from the first external terminal is formed between an outer edge of the first end face and the first external terminal in the first direction on the first end face, and a length of the exposed region is shorter than a separation distance between the edge of the first end portion of the coil portion and the edge of the first external terminal on a side far from the center position of the first end face.

3. The coil component according to claim 1, wherein the first external terminal is formed of a resin electrode containing resin and metal powder.

4. The coil component according to claim 1, wherein the pair of coil portions each have a second end portion exposed to the second end face, and the second end portions sandwich a center position of the second end face in a second direction in which the insulating substrate extends on the second end face, wherein the coil component further comprises a pair of second external terminals provided on the second end surface, connected to the second end portions of the pair of coil portions, respectively, and sandwiching a center position of the second end surface in the second direction, and wherein a center position of the second external terminal is biased toward the center position side of the second end face with respect to a center position of the second end portion in the second direction on the second end face.

* * * * *